US010391816B2

(12) United States Patent
Suita

(10) Patent No.: US 10,391,816 B2
(45) Date of Patent: Aug. 27, 2019

(54) PNEUMATIC TIRE

(71) Applicant: TOYO TIRE & RUBBER CO., LTD., Osaka-shi, Osaka (JP)

(72) Inventor: Harunobu Suita, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 233 days.

(21) Appl. No.: 15/222,073

(22) Filed: Jul. 28, 2016

(65) Prior Publication Data

US 2017/0028784 A1 Feb. 2, 2017

(30) Foreign Application Priority Data

Jul. 29, 2015 (JP) ................................ 2015-150099

(51) Int. Cl.

| | |
|---|---|
| ***B60C 9/20*** | (2006.01) |
| ***B60C 9/22*** | (2006.01) |
| ***B60C 9/28*** | (2006.01) |
| ***B60C 11/03*** | (2006.01) |

(Continued)

(52) U.S. Cl.

CPC .................. *B60C 9/20* (2013.01); *B60C 3/04* (2013.01); *B60C 9/28* (2013.01); *B60C 11/0306* (2013.01); *B60C 11/11* (2013.01); *B60C 2009/2016* (2013.01); *B60C 2009/2022* (2013.01); *B60C 2009/2061* (2013.01); *B60C 2200/06* (2013.01)

(58) Field of Classification Search

CPC .... B60C 9/18; B60C 9/20; B60C 9/22; B60C 9/28

See application file for complete search history.

(56) References Cited

U.S. PATENT DOCUMENTS 4,949,770 A * 8/1990 Polvara ................. B60C 9/1821 152/531
2012/0234451 A1* 9/2012 Miyake ................. B60C 9/2006 152/537

(Continued)

FOREIGN PATENT DOCUMENTS

CN 103813911 A 5/2014
GB 2017019 * 10/1979

(Continued)

OTHER PUBLICATIONS

Machine translation of JP 5040922, 2012.*

(Continued)

*Primary Examiner* — Justin R Fischer
(74) *Attorney, Agent, or Firm* — Westerman, Hattori, Daniels & Adrian, LLP

(57) ABSTRACT

A belt layer includes first and second main working belts and a reinforcement belt. A cord angle of the reinforcement belt is 6 to 9 degrees. A width of the reinforcement belt is equal to or wider than 50% of a tire-section width and not wider than a width of a narrower one of the first and second main working belts. When an intersection of the perpendicular line extending from a groove bottom center of a shoulder main groove to the reinforcement belt and an upper surface of the reinforcement belt is set as an origin, a ratio of a dimension from the origin to an end portion of the reinforcement belt to a half width of the reinforcement belt is not smaller than −0.07 and not larger than 0.11.

7 Claims, 7 Drawing Sheets

(51) Int. Cl.
*B60C 11/11* (2006.01)
*B60C 3/04* (2006.01)

(56) References Cited

U.S. PATENT DOCUMENTS

| | | | | |
|---|---|---|---|---|
| 2014/0326380 | A1* | 11/2014 | Kotoku | B60C 9/0007 152/209.18 |
| 2015/0314648 | A1 | 11/2015 | Sejalon | |
| 2015/0375568 | A1 | 12/2015 | Wang | |
| 2016/0059631 | A1 | 3/2016 | Okazaki | |

FOREIGN PATENT DOCUMENTS

| | | | |
|---|---|---|---|
| JP | 5040922 | * | 10/2012 |
| JP | 2013-166397 | * | 8/2013 |
| JP | 2014-201142 | A | 10/2014 |
| WO | 2014/095957 | A1 | 6/2014 |
| WO | 2014/103064 | A1 | 7/2014 |

OTHER PUBLICATIONS

Office Action dated Jul. 21, 2017, issued in counterpart Chinese Application No. 201610591351.3, with English translation. (15 pages).

Office Action dated Dec. 29, 2017, issued in counterpart Chinese Application No. 201610591351.3, with English translation. (10 pages).

* cited by examiner

PNEUMATIC TIRE

CROSS-REFERENCE TO RELATED APPLICATIONS

This application claims priority of Japanese Patent Application No. 2015-150099 filed on Jul. 29, 2015, the content of which is incorporated herein by reference.

BACKGROUND OF THE INVENTION

Field of the Invention

The present invention relates to a pneumatic tire.

Description of Related Art

Conventionally, there is well-known a pneumatic tire in which a position on a tread surface of a tread corresponding to an outermost end in a tire-width direction of a belt layer in a circumferential direction is located in a shoulder side land part, and a distance in the tire-width direction between the outermost end in the tire-width direction of the belt layer in the circumferential direction and a tire equator side end in the shoulder side land part is equal to or wider than 12% of a half width in the tire-width direction of the belt layer in the circumferential direction and not wider than 22% thereof (for example, see JP 2014-201142 A).

SUMMARY

However, in the conventional pneumatic tire, an excessively large binding force in a tire-radial direction is generated by the belt layer in the circumferential direction. For this reason, deformation in the tire-width direction is promoted so that distortion of a bead portion is increased. As a result, there is a problem in that bead durability is deteriorated. Moreover, when the tire makes contact with the ground, deformation in the circumferential direction of the tread is suppressed strongly. For this reason, there is a problem in that a ground-contact property of a shoulder is deteriorated and a partial abrasion is likely to be caused over a tire ground-contact surface.

It is an object of the present invention to provide a pneumatic tire capable of maintaining desirable belt durability and bead durability and enhancing a partial abrasion resistance of a tire ground-contact surface.

An aspect of the present invention provides pneumatic tire, comprising a belt layer arranged between a carcass and a tread portion, wherein the belt layer comprises: a first main working belt; a second main working belt arranged at an outer side of the first main working belt in a tire-radial direction; and a reinforcement belt, wherein a cord angle of the second main working belt differs from a cord angle of the first main working belt in a direction with respect to a tire-circumferential direction, wherein a cord angle of the reinforcement belt is not smaller than 6 degrees and not larger than 9 degrees, and wherein a width of the reinforcement belt is equal to or wider than 50% of a tire-section width and not wider than either narrower one of the first and second main working belts.

In this specification, the term "cord angle" is defined an acute angle which a cord of a belt or a ply forms with respect to a tire-circumferential direction. When the cord extends in the tire-circumferential direction, the cord angle is 0 degrees.

The cord angle of the reinforcement belt is set to a value not smaller than 6 degrees and not larger than 9 degrees, instead of setting the cord angle to a small angle such as an angle of not smaller than 0 degrees and not larger than 5 degrees (an angle substantially regarded as 0 degrees or an angle close to such angle). Such configuration can obviate a phenomenon where a binding force in a tire-radial direction generated by the reinforcement belt becomes excessively large, and therefore can suppress the excessively large deformation of the tire in the tire-width direction. As a result, the distortion generated in the bead portion can be suppressed, and therefore bead durability can be enhanced.

The cord angle of the reinforcement belt set to a value not smaller than 6 degrees and not larger than 9 degrees reduces an effect of suppressing a growth of the tire in the tire-radial direction compared to the case where the cord angle is set to a value not smaller than 0 degrees and not larger than 5 degrees. However, the cord angle of the reinforcement belt is allowed to take 9 degrees at maximum, and therefore there is no possibility that a binding force in the tire-radial direction is excessively reduced. Further, the width of the reinforcement belt is equal to or wider than 50% of a tire-section width. That is, the reinforcement belt has a sufficiently wide width instead of the narrow width. Due to the above-mentioned reasons, the tire can ensure a desired effect of suppressing a growth of the tire in the radial direction. Further, the tire can acquire a sufficient force for holding a shape of the tread portion so that distortion at an end portion of the belt can be reduced whereby the tire can ensure required belt durability. The width of the reinforcement belt is not wider than either narrower one of the first and second main working belts. Accordingly, the distortion generated in the reinforcement belt can be reduced.

It is preferable that when a perpendicular line extending from a groove bottom center of a shoulder main groove, which is a most outwardly located groove of main grooves in a tire-width direction, to the reinforcement belt is set, and an intersection of the perpendicular line and an upper surface of the reinforcement belt is set as an origin so that an outer side and an inner side in the tire-width direction are respectively defined as positive and negative, a ratio of a dimension from the origin to an end portion of the reinforcement belt to a half width of the reinforcement belt is not smaller than −0.07 and not larger than 0.11.

By arranging the reinforcement belt within the above range, it is possible to enhance the ground-contact property of blocks at both sides constituting the shoulder main groove.

As described above, according to the pneumatic tire of the present invention, it is possible to enhance a partial abrasion resistance on a tire ground-contact surface while improving an effect of suppressing a growth in a tire-radial direction and ensuring belt durability and bead durability.

It is preferable that a ratio of a distance from a groove bottom of the shoulder main groove to the upper surface of the reinforcement belt to a distance from a lower surface of the reinforcement belt to an inner surface of the tire on the perpendicular line is not smaller than 0.9 and not larger than 1.4.

By such setting of relation between shoulder main groove and the reinforcement belt, durability of the end of the reinforcement belt can be assured.

As described above, according to the pneumatic tire of the present invention, it is possible to enhance a belt durability while improving an effect of suppressing a growth in a tire-radial direction, bead durability, and durability to a partial abrasion resistance on a tire ground-contact surface.

It is preferable that the reinforcement belt is arranged between the first main working belt and the second main working belt.

By arranging the reinforcement belt between the first main working belt and the second main working belt, bent of the reinforcement belt in regions near a road contact surface can be further eased, thereby effectively preventing cord bents.

It is preferable that the cord angles of the first and second main working belts are 20±10 degrees, more preferably 17±5 degrees.

The belt layer may further comprise a protection belt arranged at an outer side of the second main working belt in the tire-radial direction.

The belt layer may further comprise a buffer belt arranged at an inner side of the first main working belt in the tire-radial direction.

The pneumatic tire has an aspect ratio of not larger than 70% and a nominal section width of not smaller than 365.

According to the present invention, it is possible to enhance the belt durability while ensuring the effect of suppressing a growth in a tire-radial direction, the bead durability, and the partial abrasion resistance of the tire ground-contact surface.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Figure 1:
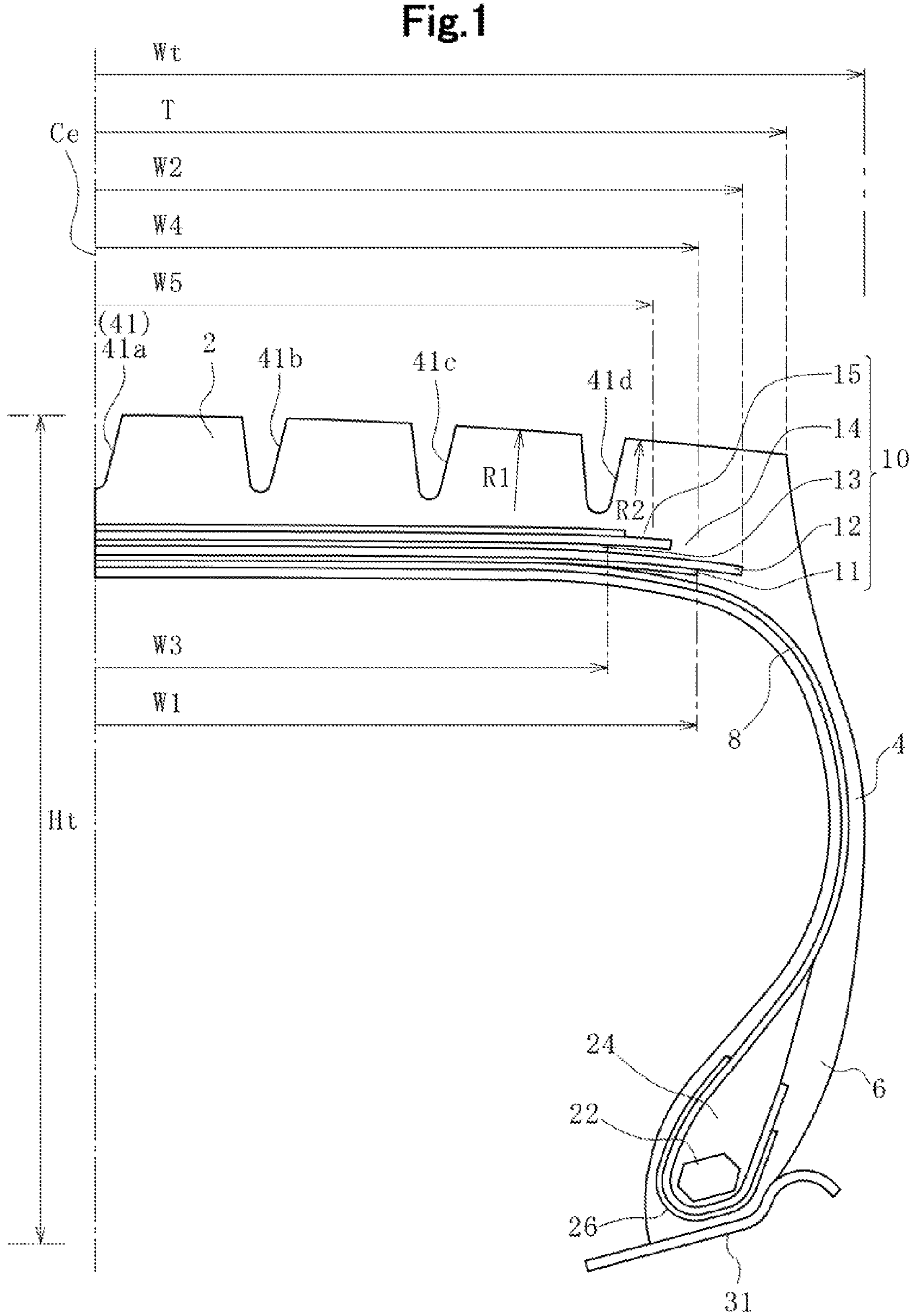
FIG. 1 is a meridian sectional view of a pneumatic tire according to an embodiment of the present invention.

FIG. 1 shows a rubber pneumatic tire (hereinafter referred to as "tire") 1 according to an embodiment of the present invention. The tire 1 is a pneumatic radial tire for a heavy load used for a vehicle such as a truck or a bus. Further, the tire 1 is a low-profile tire having an aspect ratio of not larger than 70%. An aspect ratio is defined as a ratio of a maximum tire-section height Ht to a maximum tire-section width Wt. Specifically, a size of the tire 1 in this embodiment is 445/50R22.5 (expressed in accordance with ISO standard).

The tire 1 includes a tread portion 2, a pair of side portions 4, and a pair of bead portions 6. The bead portions 6 are respectively formed on inner edge portions of the side portions 4 in a tire-radial direction (edge portions of the side portions 4 opposite to the tread portion 2). A carcass 8 is arranged between the pair of bead portions 6. An inner liner (not shown in the drawing) is arranged in an innermost peripheral surface of the tire 1. A belt layer 10 is arranged between the carcass 8 and a tread surface of the tread portion 2. In other words, in the tread portion 2, the belt layer 10 is arranged at an outer side of the carcass 8 in the tire-radial direction. As described later in detail, in this embodiment, the belt layer 10 includes five belts 11 to 15.

Figure 2:
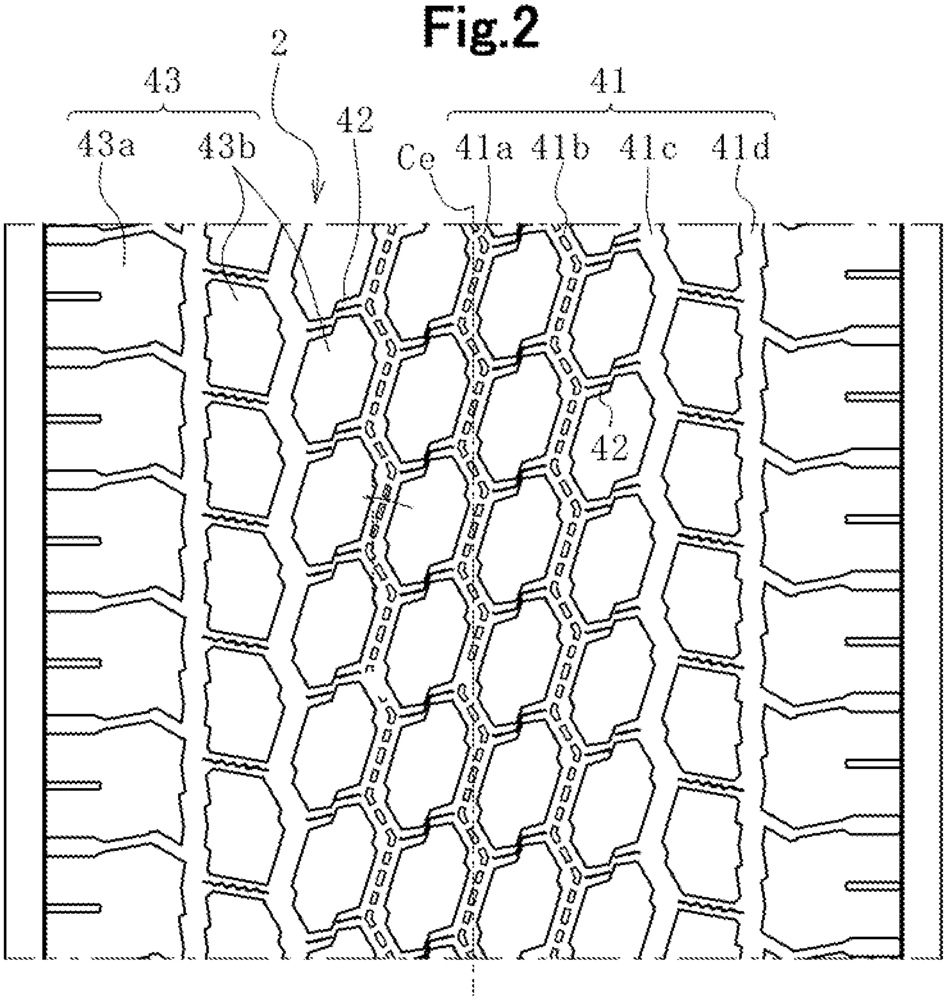
FIG. 2 is a development view of a tread portion of the pneumatic tire in FIG. 1.

With reference to FIG. 2, the tread portion 2 includes a plurality of main grooves 41 extending in zigzags in a tire-circumferential direction. Herein, the main grooves 41 include a total of seven grooves, i.e., a center groove in a tire-width direction (a center line in the tire-width direction is indicated by Ce in FIGS. 1 and 3) and three grooves on both sides thereof. The main groove located on the center line Ce is a first main groove 41*a*, the main groove located on each both sides thereof is a second main groove 41*b*, the main groove located on a further outer side thereof is a third main groove 41*c*, and the main groove located on an outermost side in the tire-width direction is a shoulder main groove 41*d*. A plurality of land parts are formed in the tread portion 2 by these main grooves 41*a* to 41*d*. Moreover, the tread portion 2 includes a plurality of lateral grooves 42 extending in the tire-width direction. The land part of the tread portion 2 is divided into a plurality of blocks 43 by these lateral grooves 42. Out of the blocks 43, the block which is located on an outermost row in the tire-width direction of the tread portion 2 is a shoulder block 43*a*. Moreover, in a tire meridian section, tread surfaces of the inner blocks 43*b* across the shoulder main groove 41*d* from the shoulder block 43*a* has a radius of curvature R1 set to be larger than a radius of curvature R2 of a tread surface of the shoulder block 43*a*. Accordingly, the radii of curvature R1 and R2 intersect with each other in the shoulder main groove 41*d*.

Figure 3:
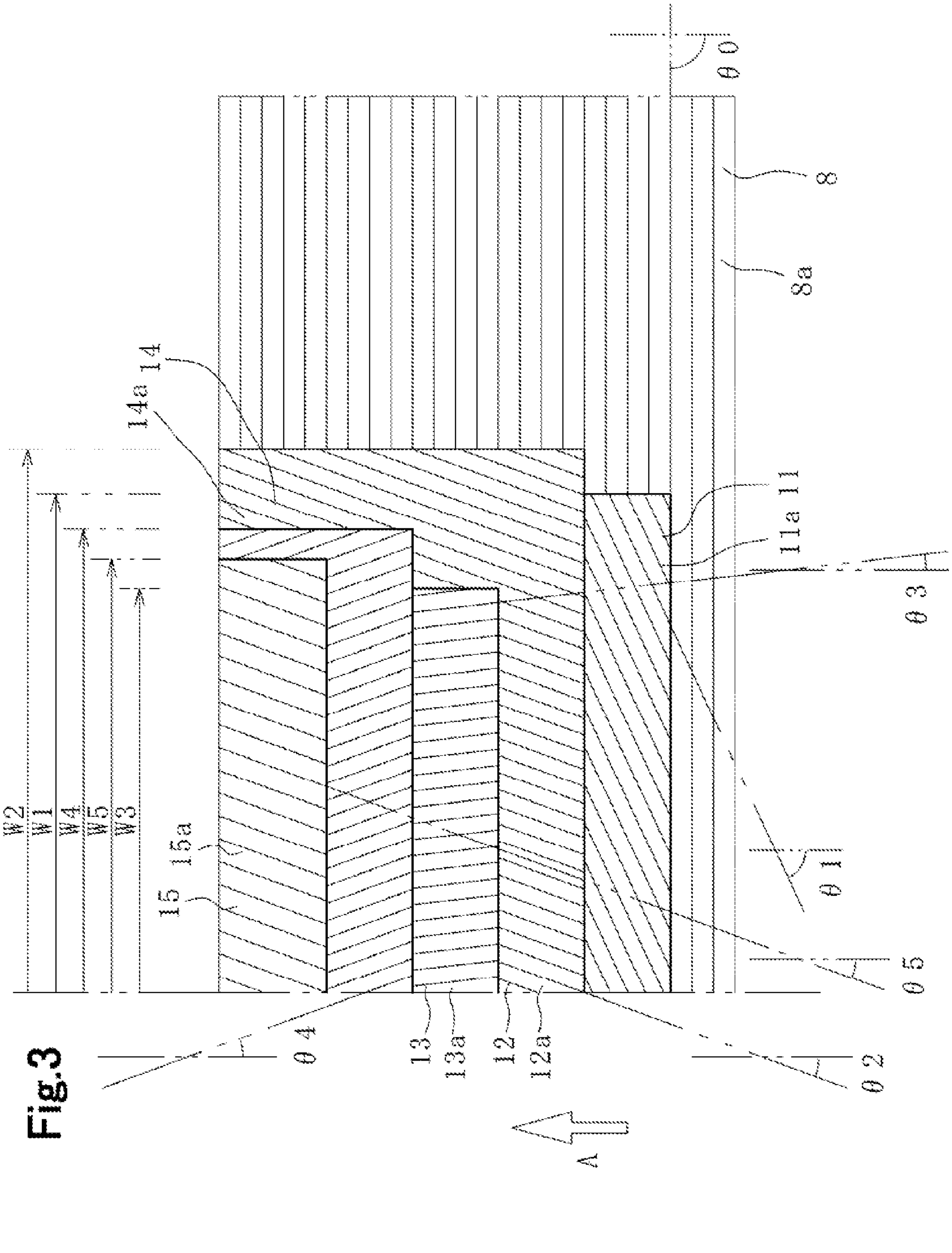
FIG. 3 is a development view of a belt layer.

Referring to FIGS. 1 and 3, the carcass 8 in this embodiment is formed of one carcass ply, and is formed of a plurality of carcass cords 8*a* arranged parallel to each other and coated by a rubber layer. Each carcass cord 8*a* is arranged so as to extend in the tire-radial direction, and has an angle θ0 with respect to a tire-circumferential direction (cord angle) set to 90 degrees. In FIGS. 1 and 2, symbol Ce indicates a center line in the tire-width direction. The direction along which the center line Ce extends is a tire-radial direction. While the carcass cord 8*a* in this embodiment is made of steel, the carcass cord 8*a* can be made of organic fibers.

The belt layer 10 in this embodiment includes five belts arranged in an overlapping manner. These belts include a buffer belt 11, a first main working belt 12, a reinforcement belt 13, a second main working belt 14, and a protection belt 1

The buffer belt 11 is arranged adjacently to an outer side of the carcass 8 in the tire-radial direction. The first main working belt 12 is arranged adjacently to an outer side of the buffer belt 11 in the tire-radial direction. The second main working belt 14 is arranged at an outer side of the first main working belt 12 in the tire-radial direction.

The reinforcement belt 13 is arranged between the first main working belt 12 and the second main working belt 14. That is, the reinforcement belt 13 is arranged adjacently to the outer side of the first main working belt 12 in the tire-radial direction, and is also arranged adjacently to an inner side of the second main working belt 14 in the tire-radial direction. The protection belt 15 is arranged adjacently to an outer side of the second main working belt 14 in the tire-radial direction.

In the case where a perpendicular line extending from a groove bottom center of the shoulder main groove 41*d* to the reinforcement belt 13 is set, and an intersection of the perpendicular line and an upper surface of the reinforcement belt 13 is set as an origin so that an outer side and an inner side in the tire-width direction are respectively defined as positive and negative, a ratio S/(W3/2) of a dimension S to an end portion of the reinforcement belt 13 with respect to a width dimension W3/2 from the center line Ce of the reinforcement belt 13 is set to satisfy −0.07≤S/(W3/2)≤0.11.

Moreover, a ratio D1/D2 of a distance D1 from the groove bottom of the shoulder main groove 41*d* to the upper surface of the reinforcement belt 13 to a distance D2 from the lower surface of the reinforcement belt 13 to the inner surface of the tire on the perpendicular line is set to satisfy 0.9≤D1/D2≤1.4.

Main functions of the first and second main working belts 12 and 14 are to apply a binding force in the tire-radial direction to the carcass 8 (with a cord angle θ0 being set to 90 degrees). A main function of the reinforcement belt 13 is to compensate for the shortage in a binding force in the tire-radial direction which is applied to the tire 1 by the first and second main working belts 12 and 14. A main function of the protection belt 15 is to enhance external damage resistance of the tire 1 by protecting the first and second main working belts 12 and 14. A main function of the buffer belt 11 is to enhance impact resistance of the tire 1.

Each of these belts 11 to 15 is formed of a plurality belt cords 11*a*, 12*a*, 13*a*, 14*a*, and 15*a* arranged parallel to each other and coated by a rubber layer.

Referring FIG. 3, inclination angles (cord angles) θ1 to θ5 of the belt cords 11*a* to 15*a* of belts 11 to 15 forming the belt layer 10 will be described. In the description hereinafter, regarding the cord angles θ1 to θ5, a direction along which the belt cords 11*a* to 15*a* extend rightward and away from the center line Ce in the tire-width direction when an arrow A in FIG. 2 is set as a reference direction can be referred to as "right upward direction". Similarly, a direction along which the belt cords 11*a* to 15*a* extend leftward and away from the center line Ce in the tire-width direction when the allow A in FIG. 2 is set as the reference direction can be referred to as "left upward direction".

In this embodiment, the cord angle θ2 of the belt cord 12*a* of the first main working belt 12 is set to 17 degrees (right upward direction). The cord angle θ2 can be set to any value which falls within a range of 20±10 degrees, and can preferably be set to a value which falls within a range of 17±5 degrees.

In this embodiment, the cord angle θ4 of the belt cord 14*a* of the second main working belt 14 is set to 17 degrees (left upward direction). The cord angle θ4 can be set to a value which falls within a range of 20±10 degrees, and can preferably be set to a value which falls within a range of 17±5 degrees.

The cord angles θ2 and θ4 of the first and second main working belts 12, 14 are set so that the belt cords 12*a* and 14*a* extend in different directions with respect to the center line Ce in the tire-width direction. That is, one of the cord angles θ2 and θ4 is set so that the belt cords extend in the right upward direction, and the other of them is set so that the belt cords extend in the left upward direction.

The cord angle θ3 of the belt cord 13*a* of the reinforcement belt 13 is set to 7 degrees (left upward direction) in this embodiment. The cord angle θ3 can be set to a value which falls within a range of not smaller than 6 degrees and not larger than 9 degrees.

The cord angle θ1 of the belt cord 11*a* of the buffer belt 11 is set to 65 degrees in this embodiment. The cord angle θ1 can be set to a value which falls within a range of 60±15 degrees.

The cord angle θ5 of the belt cord 15*a* of the protection belt 15 is set to 20 degrees in this embodiment. The cord angle θ5 can be set to a value which falls within a range of 20±10 degrees.

Numerical values (including upper and lower limit values of a numerical value range) of the cord angles θ1 to θ5 can include substantially unavoidable errors, and are not necessarily geometrically precise values as long as that functions required for the belts 11 to 15 are satisfied. This is also applied to the cord angle θ0 of the carcass cords 8*a*.

The cord angles θ1 to θ5 of the belts 11 to 15 can be coordinated as shown in the following Table 1.

TABLE 1

| | Embodiment | Settable range of angle |
|---|---|---|
| Buffer belt | 65 degrees (right upward direction) | 60 ± 15 degrees |
| First main working belt | 17 degrees (right upward direction) | 20 ± 10 degrees (17 ± 5 degrees) |
| Reinforcement belt | 7 degrees (left upward direction) | Not smaller than 6 degrees and not larger than 9 degrees |
| Second main working belt | 17 degrees (left upward direction) | 20 ± 10 degrees (17 ± 5 degrees) |
| Protection belt | 20 degrees (right upward direction) | 20 ± 10 degrees |

Main data except for the cord angles of the belts 11 to 15 in this embodiment are shown in the following Table 2.

TABLE 2

| | Raw material | Diameter of cord (mm) | Thickness of cord including cover rubber (mm) | Number of ends (EPI) | Width (mm) |
|---|---|---|---|---|---|
| Buffer belt | Steel | 1.1 | 1.7 | 12 | W1 = 345 |
| First main working belt | Steel | 1.4 | 2.6 | 12 | W2 = 370 |
| Reinforcement belt | Steel | 1.1 | 1.7 | 12 | W3 = 290 |
| Second main working belt | Steel | 1.4 | 2.6 | 12 | W4 = 325 |
| Protection belt | Steel | 1.1 | 1.9 | 9 | W5 = 295 |

As shown in Table 2, in this embodiment, a width W4 (325 mm) of the second main working belt 14 which is arranged relatively outer side in the tire-radial direction is set narrower than a width W2 (370 mm) of the first main working belt 12 which is arranged relatively inner side in the tire-radial direction.

A width W3 of the reinforcement belt 13 is set to a value equal to or wider than 50% of a maximum tire-section width Wt (W3≥0.5 Wt). In this embodiment, the maximum tire-section width Wt is a value set under conditions where the tire 1 is mounted on a predetermined rim (a rim 31 is schematically shown in FIG. 1), the tire 1 is filled with air until an inner pressure reaches a predetermined internal pressure (830 kPa which is an internal pressure determined by the Tire and Rim Association, Inc (TRA)), and the tire 1 is in an unloaded state. The width W3 of the reinforcement belt 13 is set narrower than a width of either one of the first and second main working belts 12 and 14 having a narrower width than the other (W3<W2, W4). In this embodiment, the width W3 of the reinforcement belt 13 is set to 290 mm. Accordingly, the width W3 of the reinforcement belt 13 is equal to or wider than 50% of a maximum tire-section width Wt (440 mm) under the above-mentioned conditions, and is narrower than the width W4 (325 mm) of the second main working belt 14 having a narrower width.

The cord angle θ3 of the reinforcement belt 13 is is set to an angle of not smaller than 6 degrees and not larger than 9 degrees, instead of a small angle of not smaller than 0 degrees to not more than 5 degrees (an angle which can be substantially regarded as 0 degrees or an angle close to 0 degrees). Such configuration can prevent a binding force in a tire-radial direction generated by a reinforcement belt 13 from becoming excessively large, and therefore the excessively large deformation of the tire in the tire-width direction can be suppressed. Since the excessively large deformation of the tire in the tire-width direction can be suppressed, the distortion generated in the bead portion 6 can be suppressed, and therefore bead durability (resistance against the generation of a defect such as separation in the bead portion) can be enhanced.

Figure 4:
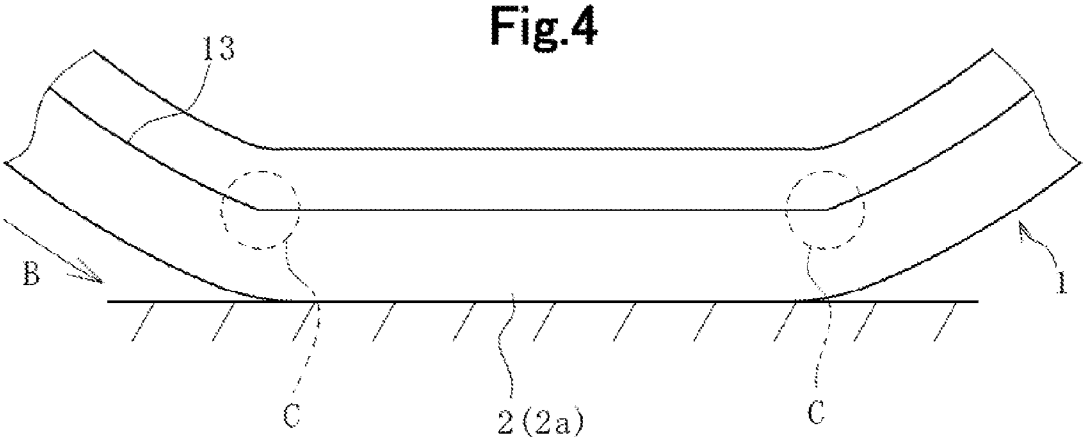
FIG. 4 is a schematic partial sectional view of the pneumatic tire when a load is applied.

As conceptually shown in FIG. 4, in a loaded state (a state where the tire 1 is mounted on a vehicle), belt cords 13*a* of the reinforcement belt 13 are bent in regions (symbols C) of a tread surface of the tread portion 2 in front of and behind a road contact surface 2*a* in the rotational direction of the tire indicated by an arrow B. The smaller cord angle θ3, the more conspicuous the bending of the belt cords 13*a* becomes. By setting the cord angle θ3 to a value not smaller than 6 degrees and not larger than 9 degrees, compared to a case where the cord angle θ3 is set to a small angle such as an angle not smaller than 0 degrees and not larger than 5 degrees, bending of the belt cord 13*a* of the reinforcement belt 13 in the vicinity of the road contact surface 2*a* can be alleviated, and therefore cord breakage can be effectively prevented.

As described above, the width W3 of the reinforcement belt 13 is set narrower than the width W4 of the second main working belt 14 which is narrower one of the first and second main working belts 12, 14. Such configuration can also effectively prevent cord breakage of the belt cord 13*a* of the reinforcement belt.

As described above, the reinforcement belt 13 is arranged between the first main working belt 12 and the second main working belt 14. Due to such an arrangement, the reinforcement belt 13 is protected by the first and second main working belts 14, and therefore cord breakage of the belt cord 13*a* of the reinforcement belt 13 caused due to bending of the cord in the vicinity of the road contact surface 2*a* (symbols C in FIG. 3) can be effectively prevented.

Due to these reasons, cord breakage of the reinforcement belt 13 can be effectively prevented.

By setting the cord angle θ3 of the reinforcement belt 13 to a value not smaller than 6 degrees and not larger than 9 degrees, an effect of suppressing a growth of the tire 1 in the radial direction is reduced compared to the case where the cord angle θ3 is set to a value not smaller than 0 degrees and not larger than 5 degrees. However, the cord angle θ3 of the reinforcement belt 13 is 9 degrees at maximum, and therefore there is no possibility that a binding force in the tire-radial direction is excessively reduced. Further, as described above, the width W3 of the reinforcement belt 13 is equal to or wider than 50% of a maximum tire-section width Wt. That is, a width of the reinforcement belt 13 is not narrow but is sufficiently wide. Due to these reasons, the tire 1 can ensure a required effect of suppressing a growth of the tire 1 in the radial direction. Further, the tire can acquire a sufficient force for holding a shape of the tread portion 2 so that distortion at the end portion of the belt can be reduced whereby the tire can ensure required belt durability. The width W3 of the reinforcement belt 13 is narrower than a width of the narrower one of the first and second main working belts 12 and 14 (widths W2, W4). Accordingly, the distortion generated in the reinforcement belt 13 can be reduced.

As described above, according to the tire 1 of the present embodiment, bead durability can be enhanced while an effect of suppressing a growth of the tire 1 in the radial direction and belt durability are also ensured.

Figure 5:
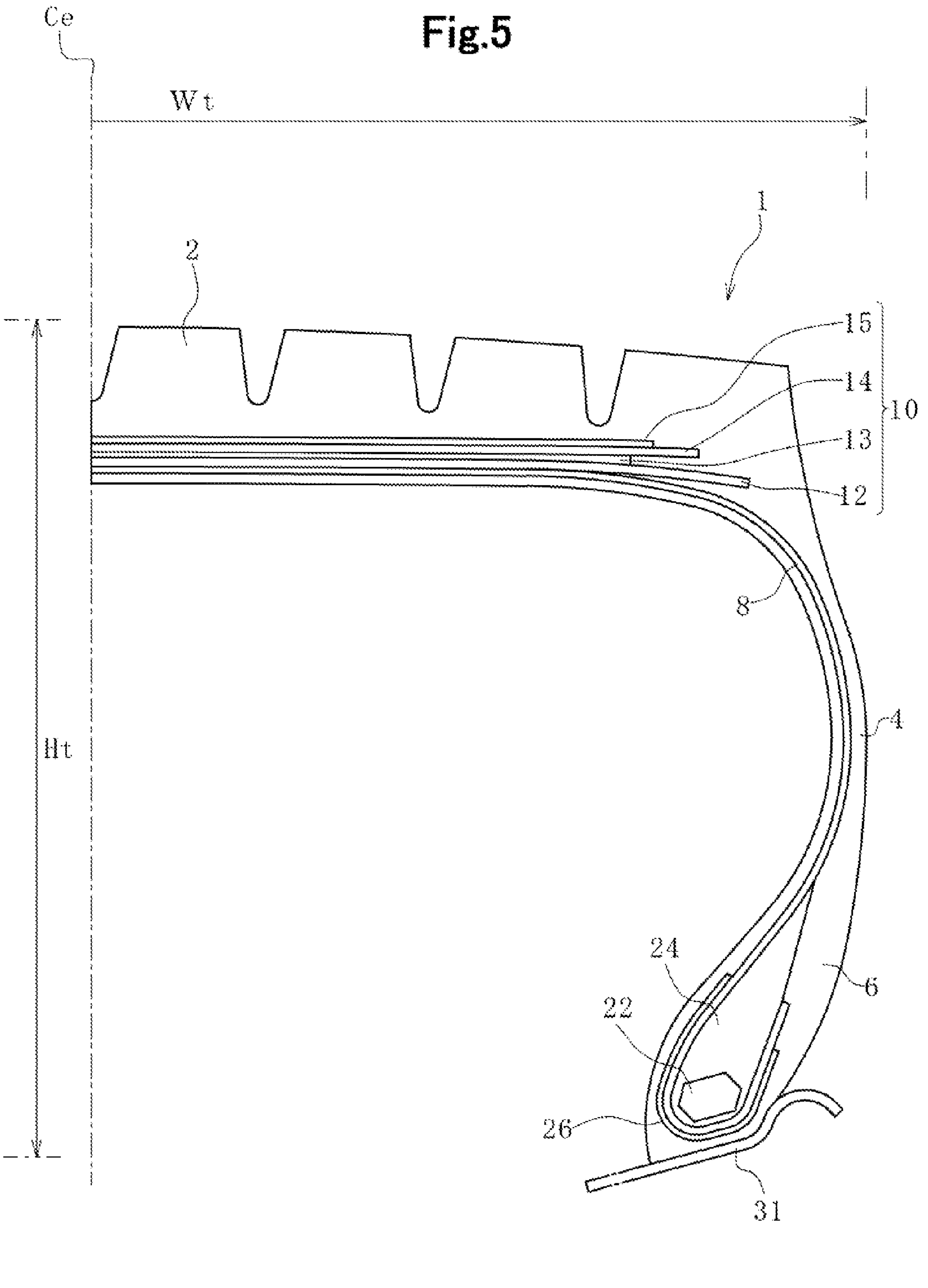
FIG. 5 is a meridian sectional view of a pneumatic tire according to a modification.

FIG. 5 shows a modification of the tire 1 according to the embodiment. In this modification, a belt layer 10 includes four belts, that is, a first main working belt 12, a reinforcement belt 13, a second main working belt 14, and a protection belt 15, but does not include a buffer belt 11. Even in the case where the belt layer 10 does not include the buffer belt 11, bead durability can be enhanced while an effect of suppressing a growth of the tire 1 in the radial direction and belt durability are also ensured.

Examples 1

Tires according to Comparative Examples 1 to 5 and tires according to Examples 1 to 4 shown in the following Table 3 were subjected to an evaluation test performed for evaluating belt durability and bead durability. Assume that data which are not described particularly hereinafter are shared in common by the tires according to Comparative Examples 1 to 5 and the tires according to Examples 1 to 4. Particularly, in all of Comparative Examples 1 to 5 and the tires according to Examples 1 to 4, a tire size is set to 445/50R22.5.

TABLE 3

| | Comparative Example 1 | Comparative Example 2 | Comparative Example 3 | Comparative Example 4 | Comparative Example 5 |
|---|---|---|---|---|---|
| Note | No reinforcement belt (FIG. 5) | Reinforcement belt extending in circumferential direction | Cord angle θ3 excessively small | Cord angle θ3 excessively large | Width W3 excessively small |
| Cord angle θ3 (degrees) of reinforcement belt | — | 0 | 5 | 10 | 7 |
| Width W3 of reinforcement belt (mm) | — | 290 | 290 | 290 | 180 |
| W3/Wt * 100 (%) | — | 66 | 66 | 66 | 41 |
| Belt durability | 100 | 130 | 127 | 105 | 90 |
| Bead durability | 100 | 90 | 100 | 120 | 100 |

| | Example 1 | Example 2 | Example 3 | Example 4 |
|---|---|---|---|---|
| Note | Cord angle θ3 being lower limit value | Cord angle θ3 being a value close to center value | Cord angle θ3 being upper limit value | Width W3 being lower limit value |
| Cord angle θ3 (degrees) of reinforcement belt | 6 | 7 | 9 | 7 |
| Width W3 of reinforcement belt | 290 | 290 | 290 | 220 |
| W3/Wt * 100 (%) | 66 | 66 | 66 | 50 |
| Belt durability | 123 | 120 | 110 | 110 |
| Bead durability | 110 | 115 | 120 | 105 |

Figure 6:
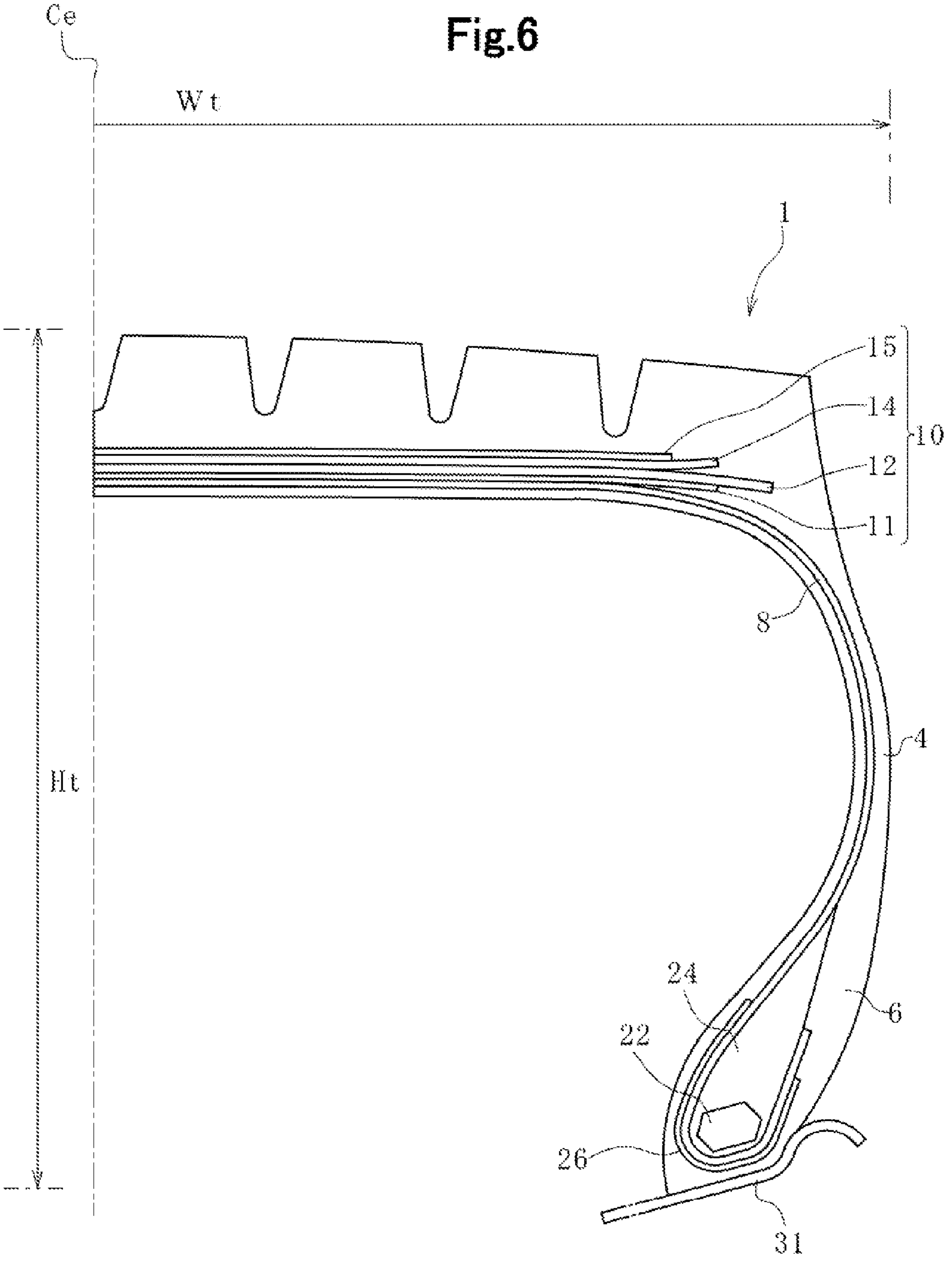
FIG. 6 is a meridian sectional view of a pneumatic tire according to Comparative Example 1.

A belt layer 10 according to Comparative Example 1 shown in FIG. 6 does not include a reinforcement belt 13, but includes a buffer belt 11, a first main working belt 12, a second main working belt 14, and a protection belt 15.

In the tire according to Comparative Example 2, a cord angle θ3 of a reinforcement belt 13 is set to 0 degrees, which is smaller than a lower limit value of a range of a cord angle θ3 (not smaller than 6 degrees and not larger than 9 degrees) in the present invention.

In the tire according to Comparative Example 3, a cord angle θ3 of a reinforcement belt 13 is set to 5 degrees, which is smaller than the lower limit value of the range of the cord angle θ3 (not smaller than 6 degrees and not larger than 9 degrees) in the present invention.

In the tire of Comparative Example 4, a cord angle θ3 according to a reinforcement belt 13 is set to 10 degrees, which is larger than an upper limit value of the range of the cord angle θ3 (not smaller than 6 degrees and not larger than 9 degrees) in the present invention.

In the tire according to Comparative Example 5, a width W3 of a reinforcement belt 13 is set to 180 mm. A tire 1 is mounted on a predetermined rim, the tire is filled with air until a tire internal pressure reaches a predetermined internal pressure, and a maximum tire-section width in an unloaded state is set to 440 mm. Accordingly, in Comparative Example 5, a ratio of the width W3 of the reinforcement belt 13 to a maximum tire section width Wt is 41%. Accordingly, the width W3 of the reinforcement belt 13 according to Comparative Example 5 is narrower than a lower limit value of a width W3 of the reinforcement belt 13 (W3=0.5 Wt) in the present invention.

In the tire of Example 1, a cord angle θ3 of a reinforcement belt 13 is set to 6 degrees, which is the lower limit value of the range of the cord angle θ3 (not smaller than 6 degrees and not larger than 9 degrees) in the present invention.

In the tire according to Example 2, a cord angle θ3 of a reinforcement belt 13 is set to 7 degrees, which is a value close to a center value of the range of the cord angle θ3 (not smaller than 6 degrees and not larger than 9 degrees) in the present invention.

In the tire according to Example 3, a cord angle θ3 of a reinforcement belt 13 is set to 9 degrees, which is the upper limit value of the range of the cord angle θ3 (not smaller than 6 degrees and not larger than 9 degrees) in the present invention.

In the tire according to Example 4, a width W3 of a reinforcement belt 13 is set to 220 mm. As described later, a maximum tire-section width under the conditions of the evaluation test is set to 440 mm. Accordingly, a ratio of the width W3 of the reinforcement belt 13 in Example 4 to the maximum tire-section width Wt is 50%. That is, the width W3 of the reinforcement belt 13 in Example 4 is a lower limit value of the width W3 of the reinforcement belt 13 (W3=0.5 Wt) in the present invention.

In this evaluation test, belt durability and bead durability are evaluated.

In evaluating belt durability, each tire has a tire size of 445/50R22.5, the tire is mounted on a wheel having a rim size of 22.5×14.00 (specified rim), and the tire is filled with air having a pressure of 930 kPa (a value obtained by adding 100 kPa to 830 kPa which is an internal pressure determined by TRA). Each tire mounted on the wheel is mounted on a drum tester, and a traveling test is performed under conditions where a speed is set to 40 km/h and a load is set to 54.4 kN. In such a case, traveling distances of respective tires before the tires are broken are expressed as indexes respectively as shown in Table 3.

In evaluating bead durability, each tire has a tire size of 445/50R22.5, the tire was mounted on a wheel having a rim size of 22.5×14.00 (specified rim), and the tire was filled with air having a pressure of 900 kPa (a value obtained by adding 70 kPa to 830 kPa which is an internal pressure specified by TRA). Each tire mounted on the wheel was mounted on a drum tester, and a traveling test was performed under conditions where a speed is set to 40 km/h and a load is set to 72.5 kN. In such a case, traveling distances of respective tires before the tires were broken are expressed as indexes respectively as shown in Table 3.

An internal pressure of air filled in the tire and a load applied to the tire differ between the evaluation of belt durability and the evaluation of bead durability. The reason is that the condition that distortion is liable to be generated in the belt layer 10 is adopted in the evaluation of belt durability, while the condition that distortion is liable to be generated in the bead portion 6 is adopted in evaluation of bead durability.

In both belt durability and bead durability, assuming the performance of the tire according to Comparative Example 1 as 100, performances of tires according to the remaining Comparative Examples 2 to 5 and Examples 1 to 4 are indexed.

In all Examples 1 to 4, the indexes of belt durability are not smaller than 110, showing that all tires have favorable belt durability. In all Examples 1 to 4, indexes of bead durability are not smaller than 105, showing that the tires can have favorable bead durability.

In the tires according to Comparative Examples 2 and 3 where the cord angles θ3 of the reinforcement belt 13 are lower than a lower limit value of the range of the cord angle θ3 (not smaller than 6 degrees and not larger than 9 degrees) in the present invention, although indexes of belt durability exceed 110, indexes of bead durability are lower than 105. That is, in the case where a cord angle θ3 of a reinforcement belt 13 is set to an angle smaller than a value which falls within the range of the cord angle θ3 according to the present invention, even when a tire has the same belt durability as the tires according to Examples 1 to 4, the tire cannot acquire sufficient bead durability.

In the tire according to Comparative Example 4 where the cord angle θ3 of the reinforcement belt 13 exceeds the upper limit value of the range of the cord angle θ3 (not smaller than 6 degrees and not larger than 9 degrees) of the present invention, although an index of bead durability exceeds 105, an index of belt durability is lower than 110. That is, in the case where the cord angle θ3 of the reinforcement belt 13 is set to an angle larger than a value which falls within the range of the present invention, even when a tire has the same bead durability as the tires of Examples 1 to 4, the tire cannot acquire sufficient belt durability.

In the tire according to Comparative Example 5 where a ratio of a width W3 of the reinforcement belt 13 to a maximum tire-section width Wt is lower than the lower limit value of the range (equal to or wider than 50% of maximum tire-section width) in the present invention, an index of bead durability is lower than 105, and an index of belt durability is lower than 110. That is, when the width W3 of the reinforcement belt 13 is narrower than a value which falls within the range of the present invention, the tire cannot acquire sufficient bead durability and sufficient belt durability.

In the tire according to Comparative Example 4 in which the reinforcement belt 13 is arranged on the inner side of the first main working belt 12 in the tire-radial direction, although the index of the bead durability exceeds 105, the index of the belt durability is slightly lower than 110. Accordingly, in view of enhancement in the belt durability, it is preferable that the reinforcement belt 13 is arranged between the first main working belt 12 and the second main working belt 14 rather than on the inner side of the first main working belt 12 in the tire-radial direction.

As described above, by comparing the tires according to Comparative Examples 1 to 5 and the tires according to Examples 1 to 4, it is understood that, according to the present invention, bead durability can be enhanced while belt durability in the pneumatic tire is also ensured.

Example 2

Moreover, tires according to Comparative Examples 11 to 16 and Examples 11 to 15 shown in the following Table 4 were subjected to an evaluation test performed for evaluating the partial abrasion resistance, the belt durability, and the groove bottom cracking resistance in the tread portion 2. Assume that data which are not described particularly hereinafter are shared in common by the tires according to Comparative Examples and Examples. Particularly, in all of Comparative Examples and Examples, a tire size is set to 445/50R22.5. Moreover, all of the cord angles θ3 of the reinforcement belts 13 are set to 7 degrees.

TABLE 4

| | Comparative Example 11 | Comparative Example 12 | Comparative Example 13 | Comparative Example 14 |
|---|---|---|---|---|
| | No reinforcement belt | Reinforcement belt cord angle being 0 degrees | S/(W3/2) excessively small | S/(W3/2) excessively large |
| Belt angle (degrees) of reinforcement belt | — | 0 | 7 | 7 |
| S | — | 7 | −10 | 19 |
| W3/2 | — | 145 | 128 | 157 |
| S/(W3/2) | — | 0.05 | −0.08 | 0.12 |
| D1 | — | 8.7 | 8.7 | 8.7 |
| D2 | — | 7.6 | 7.6 | 7.6 |
| D1/D2 | — | 1.1 | 1.1 | 1.1 |
| Partial abrasion resistance | 100 | 90 | 110 | 90 |
| Belt durability | 100 | 130 | 98 | 162 |
| Groove bottom cracking resistance | 100 | 100 | 100 | 100 |

TABLE 4-continued

| | Comparative Example 15 | Comparative Example 16 | Example 11 | Example 12 |
|---|---|---|---|---|
| | D1/D2 excessively small | D1/D2 excessively large | Approximately center value | S/(W3/2) being lower limit value |
| Belt angle (degrees) of reinforcement belt | 7 | 7 | 7 | 7 |
| S | 7 | 7 | 7 | −9 |
| W3/2 | 145 | 145 | 145 | 129 |
| S/(W3/2) | 0.05 | 0.05 | 0.05 | −0.07 |
| D1 | 7.7 | 11.7 | 8.7 | 8.7 |
| D2 | 9.3 | 7.6 | 7.6 | 7.6 |
| D1/D2 | 0.8 | 1.5 | 1.1 | 1.1 |
| Partial abrasion resistance | 100 | 100 | 100 | 107 |
| Belt durability | 131 | 98 | 120 | 100 |
| Groove bottom cracking resistance | 95 | 100 | 100 | 100 |

| | Example 13 | Example 14 | Example 15 |
|---|---|---|---|
| | S/(W3/2) being upper limit value | D1/D2 being lower limit values | D1/D2 being upper limit values |
| Belt angle (degrees) of reinforcement belt | 7 | 7 | 7 |
| S | 17 | 7 | 7 |
| W3/2 | 155 | 145 | 145 |
| S/(W3/2) | 0.11 | 0.05 | 0.05 |
| D1 | 8.7 | 8.7 | 10.7 |
| D2 | 7.6 | 9.3 | 7.6 |
| D1/D2 | 1.1 | 0.9 | 1.4 |
| Partial abrasion resistance | 93 | 100 | 100 |
| Belt durability | 155 | 128 | 104 |
| Groove bottom cracking resistance | 100 | 100 | 100 |

In the tire according to Comparative Example 11, the belt layer does not include the reinforcement belt 13 but is configured by four other belts (the buffer belt 11, the first main working belt 12, the second main working belt 14, and the protection belt 15).

In the tire according to Comparative Example 12, the ratio S/W3/2 of the dimension S to the end portion of the reinforcement belt 13 to the width dimension W3/2 from the center line Ce of the reinforcement belt 13 is 0.05. The ratio D1/D2 of the distance D1 from the groom bottom of the shoulder main groove 41*d* to the upper surface of the reinforcement belt 13 to the distance D2 from the lower surface of the reinforcement belt 13 to the inner surface of the tire is 1.1.

In the tire according to Comparative Example 13, the ratio S/(W3/2) is −0.08, which is smaller than the lower limit value of the range (not smaller than −0.07 and not larger than 0.11) according to the present invention. The ratio D1/D2 is 1.1, which is an approximately center value of the range (not smaller than 0.9 and not larger than 1.4) according to the present invention.

In the tire according to Comparative Example 14, the ratio S/(W3/2) is 0.12, which exceeds the upper limit value of the range (not smaller than −0.07 and not larger than 0.11) according to the present invention. The ratio D1/D2 is 1.1, which is the approximately center value of the range (not smaller than 0.9 and not larger than 1.4) according to the present invention.

In the tire according to Comparative Example 15, the ratio S/(W3/2) is 0.05, which is within the range (not smaller than −0.07 and not larger than 0.11) according to the present invention. The ratio D1/D2 is 0.8, which is smaller than the lower limit value of the range (not smaller than 0.9 and not larger than 1.4) according to the present invention.

In the tire according to Comparative Example 16, the ratio S/(W3/2) is 0.05, which is within the range (not smaller than −0.07 and not larger than 0.11) according to the present invention. The ratio D1/D2 is 1.5, which exceeds the upper limit value of the range (not smaller than 0.9 and not larger than 1.4) according to the present invention.

In the tire according to Example 11, the ratio S/(W3/2) is 0.05, which is within the range (not smaller than −0.07 and not larger than 0.11) according to the present invention. The ratio D1/D2 is 1.1, which is the approximately center value of the range (not smaller than 0.9 and not larger than 1.4) according to the present invention.

In the tire according to Example 12, the ratio S/(W3/2) is −0.07, which is the lower limit value of the range (not smaller than −0.07 and not larger than 0.11) according to the present invention. The ratio D1/D2 is 1.1, which is the approximately center value of the range (not smaller than 0.9 and not larger than 1.4) according to the present invention.

In the tire according to Example 13, the ratio S/(W3/2) is 0.11, which is the upper limit value of the range (not smaller than −0.07 and not larger than 0.11) according to the present invention. The ratio D1/D2 is 1.1, which is the approximately center value of the range (not smaller than 0.9 and not larger than 1.4) according to the present invention.

In the tire according to Example 14, the ratio S/(W3/2) is 0.05, which is within the range (not smaller than −0.07 and not larger than 0.11) according to the present invention. The ratio D1/D2 is 0.9, which is the lower limit value of the range (not smaller than 0.9 and not larger than 1.4) according to the present invention.

In the tire according to Example 15, the ratio S/(W3/2) is 0.05, which is within the range (not smaller than −0.07 and not larger than 0.11) according to the present invention. The ratio D1/D2 is 1.4, which is the upper limit value of the range (not smaller than 0.9 and not larger than 1.4) according to the present invention.

In this evaluation test, the partial abrasion resistance, the belt durability, and the groove bottom cracking resistance were evaluated.

In the evaluation of the partial abrasion resistance, a tire having a tire size of 445/50R22.5 was mounted on a wheel having a rim size of 22.5×14.00 (predetermined rim) and the tire was filled with air of 830 kPa (internal pressure determined by TRA). A traveling test was performed under conditions where a speed is set to 80 km/h and a load is set to 45.4 kN (TRA 100% load), and an abrasion energy ratio acting on a block 43 on the center line Ce and the shoulder block 43_a_ was expressed as an index.

In the evaluation of the groove bottom cracking resistance, a tire having a tire size of 445/50R22.5 was mounted on a wheel having a rim size of 22.5×14.00 (predetermined rim) and the tire was filled with air of 830 kPa (internal pressure determined by TRA). Then, the tire was mounted on a rear wheel of a trailer and a traveling test was performed under conditions where a speed is set to 80 km/h and a load is set to 45.4 kN (TRA 100% load), and presence of generation of a groove bottom crack was evaluated by visual observation after travelling of 150000 miles (240000 km).

The evaluation of the belt durability is performed in the same manner as described above.

In all of the partial abrasion resistance, the belt durability, and the groove bottom cracking resistance, assuming the performance of the tire according to Comparative Example 11 as 100, the performances of tires according to the remaining Comparative Examples 12 to 16 and Examples 11 to 15 were indexed.

As to the partial abrasion resistance, a partial abrasion is small within a range of an index of 90 to 110. Consequently, the partial abrasion resistance is excellent. When the index is lower than 100, an abrasion amount of the block on the center line Ce side is larger than that of the shoulder block 43_a_. To the contrary, when the index exceeds 100, the abrasion amount of the shoulder block 43_a_ is larger than that of the block on the center line Ce side. The partial abrasion occurs extremely with an index equal to or lower than 90 and equal to or greater than 110. Consequently, it is possible to determine that an improper state for the tire performance is brought.

As to the belt durability, the index lower than 100 is improper for the tire performance, and the belt durability is more excellent if a numeric value is larger.

As to the groove bottom cracking resistance, a crack is not generated or only a permitted crack is generated when the index is 100, and a crack which cannot be permitted is generated when the index is lower than 100.

There were problems in the partial abrasion resistance in Comparative Examples 12 to 14, problems in the belt durability in Comparative Examples 13 and 16, and a problem in the groove bottom cracking resistance in Comparative Example 15, respectively.

If the ratio S/(W3/2) is smaller than −0.07, the reinforcement belt 13 is located on the inner side with respect to the shoulder main groove 41_d_ and thus separates from the shoulder block 43_a_. Accordingly, the influence on the shoulder block 43_a_ caused by the reinforcement belt 13 is reduced so that the ground-contact length of the shoulder block 43_a_ in the tire-circumferential direction is increased. In other words, the abrasion amount on the shoulder block 43_a_ side is increased. Moreover, the deformation amount on the shoulder block 43_a_ side is increased so that separation occurs between the shoulder block 43_a_ and the belt, and the belt durability is thus reduced. On the other hand, if the ratio S/(W3/2) exceeds 0.11, the influence on the shoulder block 43_a_ caused by the reinforcement belt 13 is increased so that the ground-contact length in the tire-circumferential direction is suppressed and a ground-contact property in that part is deteriorated. As a result, the abrasion amount of the block on the tire center line Ce side is relatively increased. Thus, the ground-contact length in the tire-circumferential direction is unbalanced in the position of the tire in each width direction so that the partial abrasion resistance is deteriorated.

In order to cause the ground-contact part of the tread portion of the tire to have a desirable ground-contact shape, it is necessary to set the groove depth of the shoulder main groove 41_d_ to a predetermined value. When the groove depth is excessively great, distortion tends to concentrate in the groove bottom and a crack is likely to be generated. In other words, if the ratio D1/D2 is reduced to be smaller than 0.9, which is the lower limit value, the crack is likely to be generated in the groove bottom and the groove bottom cracking resistance is deteriorated. On the other hand, when the groove depth is reduced, heat generated in an inner part by the rotation of the tire cannot be radiated well. Consequently, shearing distortion may be increased, which may cause breakage at a belt end. In other words, the belt durability is deteriorated.

In all of Examples 11 to 15, favorable results were obtained for all of the partial abrasion resistance, the belt durability, and the groove bottom cracking resistance. In Examples 11 and 14, particularly, favorable results were obtained for the partial abrasion resistance and the belt durability. This is assumed to be caused by setting the ratio S/(W3/2) to be the approximately center value of the range (not smaller than −0.07 and not larger than 0.11) according to the invention.

The present invention is not limited to the configuration described in the embodiment but various changes can be made.

Figure 7:
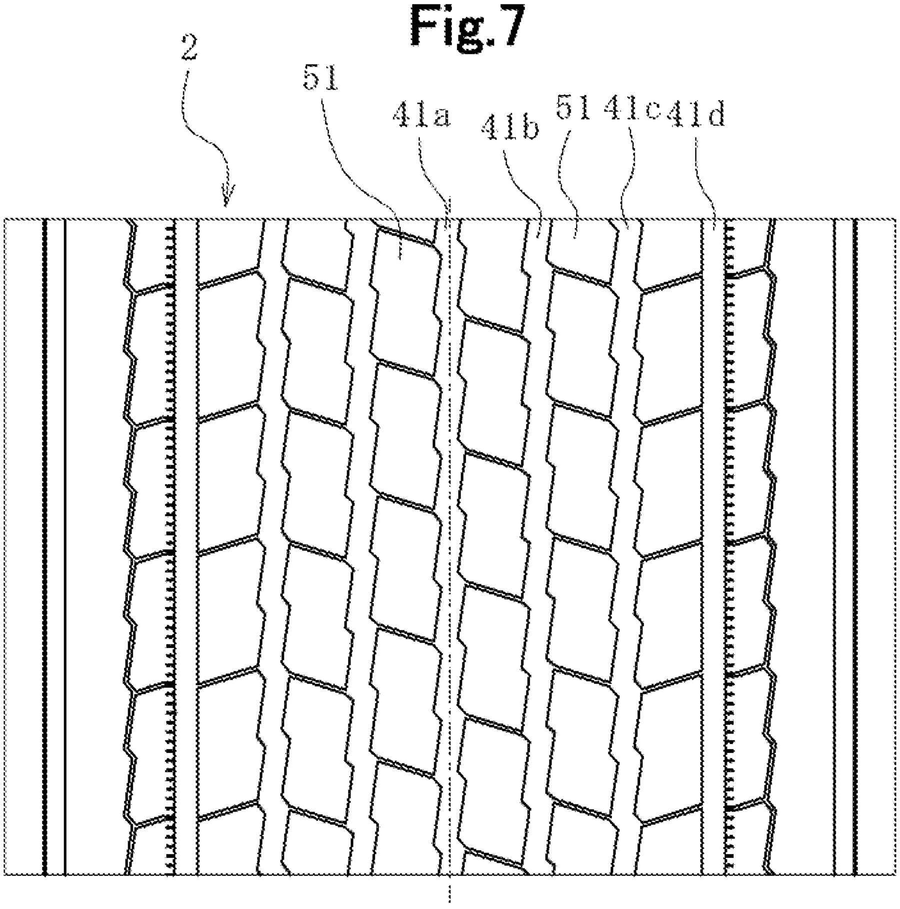
FIG. 7 is a development view of a tread portion of a pneumatic tire according to another embodiment.

In the embodiment, the description has been given of the tire including the plurality of blocks 43 as land parts to be formed in the tread portion 2. Similarly, with the tire including the ribs 51 in a plurality of rows as shown in FIG. 7, it is possible to obtain the same effects by employing the configuration described above.

The tire according to the present invention is favorably applicable to a pneumatic tire (so-called super single tire) having an aspect ratio of not larger than 70% and a nominal section width of not smaller than 365. The tire according to the present invention is also applicable to a pneumatic tire having a small aspect ratio and falling outer side a range of a pneumatic radial tire for heavy load.

What is claimed is:

1. A pneumatic tire comprising a belt layer arranged between a carcass and a tread portion, wherein the belt layer comprises a first main working belt, a second main working belt arranged at an outer side of the first main working belt in a tire-radial direction, the second main working belt having a cord angle different from a cord angle of the first main working belt in a direction with respect to a tire-circumferential direction, and a reinforcement belt, a cord angle of the reinforcement belt is not smaller than 6 degrees and not larger than 9 degrees, and is smaller than a cord angle of the first main working belt and the second main working belt, a width of the reinforcement belt is equal to or wider than 50% of a tire-section width and not wider than a width of a narrower one of the first and second main working belts, when a perpendicular line extending from a groove bottom center of a shoulder main groove, which is a most outwardly located groove of main grooves in a tire-width direction, to the reinforcement belt is set, and an intersection of the perpendicular line and an upper surface of the reinforcement belt is set as an origin so that an outer side and an inner side in the tire-width direction are respectively defined as positive and negative, a ratio of a dimension from the origin to an end portion of the reinforcement belt to a half width of the reinforcement belt is not smaller than −0.07 and not larger than 0.11, and wherein a ratio of a distance from a groove bottom of the shoulder main groove to the upper surface of the reinforcement belt to a distance from a lower surface of the reinforcement belt to an inner surface of the tire on the perpendicular line is not smaller than 0.9 and not larger than 1.4.

2. The pneumatic tire according to claim 1, wherein the reinforcement belt is arranged between the first main working belt and the second main working belt.

3. The pneumatic tire according to claim 1, wherein the cord angles of the first and second main working belts are 20±10 degrees.

4. The pneumatic tire according to claim 3, wherein the cord angles of the first and second main working belts are 17±5 degrees.

5. The pneumatic tire according to claim 1, wherein the belt layer further comprises a protection belt arranged at an outer side of the second main working belt in the tire-radial direction.

6. The pneumatic tire according to claim 1, wherein the belt layer further comprises a buffer belt arranged at an inner side of the first main working belt in the tire-radial direction.

7. The pneumatic tire according to claim 1, wherein the pneumatic tire has an aspect ratio of not larger than 70% and a nominal section width of not smaller than 365.

* * * * *